United States Patent
Lee

(10) Patent No.: US 11,555,105 B2
(45) Date of Patent: Jan. 17, 2023

(54) METHOD OF PRODUCING BIOPLASTIC PELLETS USING LIVESTOCK MANURE METHOD OF PRODUCING BIOPLASTIC PELLETS USING LIVESTOCK MANURE

(71) Applicant: Dangjin Nature World Cooperative, Chungcheongnam-do (KR)

(72) Inventor: Kyung Yong Lee, Chungcheongnam-do (KR)

(73) Assignee: Dangjin Nature World Cooperative, Chungcheongnam-do (KR)

( * ) Notice: Subject to any disclaimer, the term of this patent is extended or adjusted under 35 U.S.C. 154(b) by 65 days.

(21) Appl. No.: 17/367,696

(22) Filed: Jul. 6, 2021

(65) Prior Publication Data
US 2022/0049077 A1    Feb. 17, 2022

(30) Foreign Application Priority Data
Aug. 13, 2020   (KR) ........................ 10-2020-0101814

(51) Int. Cl.
*B09B 3/65* (2022.01)
*B09B 3/60* (2022.01)
*C08L 23/12* (2006.01)
*C08L 35/00* (2006.01)

(52) U.S. Cl.
CPC ................. *C08L 23/12* (2013.01); *B09B 3/60* (2022.01); *B09B 3/65* (2022.01); *C08L 35/00* (2013.01); *C08L 2205/03* (2013.01)

(58) Field of Classification Search
None
See application file for complete search history.

(56) References Cited

FOREIGN PATENT DOCUMENTS

| KR | 1976562 B1 * | 7/2019 | ............ C05F 11/08 |
|---|---|---|---|
| KR | 101976562 B1 | 7/2019 | |

* cited by examiner

*Primary Examiner* — Richard A Huhn
(74) *Attorney, Agent, or Firm* — WRB-IP LLP

(57) ABSTRACT

The present disclosure relates to a method of producing bioplastic pellets using livestock manure, the method including steps of: making a first mixture livestock manure, sawdust, a microbial medium and a microbial preparation; (2) making a fermentation product by stirring the first mixture; (3) making an aged product by aging the fermentation product; (4) making a dried product by drying the aged product; (5) making compost powder by crushing the dried product; and (6) mixing the compost powder, synthetic resin, a binder, a dispersing agent and a slip agent together to obtain a second mixture, and cutting the second mixture into pellets during extrusion. The method has an advantage in that it is possible to improve processability by reducing the water content of decomposed livestock manure containing a lot of water and to improve mechanical properties.

7 Claims, No Drawings

METHOD OF PRODUCING BIOPLASTIC PELLETS USING LIVESTOCK MANURE METHOD OF PRODUCING BIOPLASTIC PELLETS USING LIVESTOCK MANURE

CROSS-REFERENCE TO RELATED APPLICATION

This application claims priority from and the benefit of Korean Patent Application No. 10-2020-0101814, filed on Aug. 13, 2020, which is hereby incorporated by reference for all purposes as if set forth herein.

BACKGROUND

Field

The present disclosure relates to a method of producing bioplastic pellets using livestock manure, and more particularly to a method of producing bioplastic pellets using livestock manure, which may improve processability by reducing the water content of decomposed livestock manure containing a lot of water and may improve mechanical properties.

Discussion of the Background

Plastics are polymers with high molecular weights. They changes from gas to liquid or solid as the molecular weights thereof increase. In the solid state, these polymers have poor fluidity due to increased molecular weights thereof, but have improved mechanical properties and heat resistance and also have properties allowing them to be used as materials necessary in daily life, such as metals, wood, ceramics or rubber. Plastic products are obtained by adding various modifiers, colorants, reinforcing materials, fillers, and the like to these polymer materials and molding the mixtures. The properties of plastics are determined according to the chemical structures of synthetic resins such as PE, PP and PVC, but even the same kind of resin may have varying properties depending on many factors, and thus may be modified based on this phenomenon. Regarding the chemical structure, the polymer has varying properties depending on the molecular weight and molecular weight distribution thereof, the main chain and side chains determined according to polymerization conditions under which the polymer is produced, the end groups/terminal groups thereof, the bridge tacticity thereof, the composition distribution of the copolymer, and the like. In general, the term "compounding" refers to preparing a composition suitable for the intended use by adding various additives, reinforcing materials, modifiers, etc. to a polymer raw material, and this composition is distributed in the form of pellets.

In recent years, the amount of plastic waste has increased exponentially with the increased use of various plastics, including films used as food packaging materials. In general, plastic waste is disposed of by landfill or incineration or recycled. However, when the waste of petroleum-derived plastic products is incinerated and landfilled after the use of these products, toxic gas is generated, causing air pollution and causing a shortage of landfill space and environmental pollution. Thus, in order to solve this problem, studies have been actively conducted to develop environmentally friendly low-carbon plastics by using natural raw materials obtained using plant-derived by-products or fermentation technology.

The present applicant filed and obtained a patent related to an environmentally friendly low-carbon degradable antibacterial material and a production method therefor (Korean Patent No. 10-1976562, Jul. 15, 2019).

The environmentally low-carbon degradable antibacterial material has the advantage of resolving the problems associated with air pollution, soil pollution and water pollution by using livestock manure. However, the degradable antibacterial material has a disadvantage in that processability is low due to a lot of water contained in decomposed livestock manure. In addition, the degradable antibacterial material has a problem in that the mechanical properties thereof are inferior to those of conventional plastic compositions.

PRIOR ART DOCUMENTS (Patent Document 0001) KR 10-1976562 Bi (Jul. 15, 2019)

SUMMARY

An object of the present disclosure is to provide a method of producing bioplastic pellets using livestock manure, which may improve processability and mechanical properties by reducing the water content of decomposed livestock manure containing a lot of water.

Another object of the present disclosure is to provide a method of producing bioplastic pellets using livestock manure, which may improve mechanical properties.

To achieve the above objects, the present disclosure provides a method of producing bioplastic pellets using livestock manure, the method including steps of: (1) making a first mixture by mixing 60 to 80 wt % of livestock manure, 10 to 20 wt % of sawdust, 5 to 15 wt % of a microbial medium, and 1 to 7 wt % of a microbial preparation; (2) making a fermentation product by stirring the first mixture at 20 to 30° C. for 3 to 4 hours; (3) making an aged product by aging the fermentation product at 20 to 25° C. for 10 to 15 days; (4) making a dried product by drying the aged product at 30 to 35° C. for 22 to 24 hours; (5) making compost powder by crushing the dried product to a size of 100 to 150 mesh; and (6) mixing 55 to 60 wt % of the compost powder, 30 to 35 wt % of synthetic resin, 1 to 5 wt % of a binder, 5 to 10 wt % of a dispersing agent and 0.5 to 1 wt % of a slip agent for 15 to 30 minutes to obtain a second mixture, and cutting the second mixture into pellets during extrusion at 160 to 190° C., wherein the binder in step (6) includes 50 to 65 wt % of a styrene-maleic anhydride copolymer, 20 to 35 wt % of polysiloxane, and 10 to 25 wt % of 2-hydroxyethyl methacrylate.

In step (1), the microbial preparation includes 100 parts by weight of an enzyme activity aid, 1 to 10 parts by weight of a mixture of microbial strains, 20 to 30 parts by weight of a physiologically activating substance, and 1 to 5 parts by weight of humic acid, wherein: the enzyme activity aid is prepared by adding 0.1 to 1 part by weight of *Bacillus natto* to 100 parts by weight of meat washing water, followed by anaerobic fermentation for 5 to 7 days and aerobic fermentation for 40 to 42 days; the mixture of microbial strains includes 40 to 50 wt % of *Monascus pilosus,* 20 to 30 wt % of *Bacillus subtilis,* 10 to 20 wt % of yeast, and 5 to 15 wt % of *Aspergillus oryzae*; and the physiologically activating substance is a supernatant obtained by adding 1 to 5 parts by weight of the enzyme activity aid and 10 to 20 parts by weight of water to 100 parts by weight of an organic matter, followed by anaerobic fermentation for 10 to 20 days and aerobic fermentation for 1 to 3 days to obtain a fermented substance, adding 100 parts by weight of the fermented substance to 500 to 600 parts by weight of water to obtain a fermented substance aqueous solution, and fermenting the fermented substance aqueous solution in an aeration tank for 2 to 5 days, followed by allowing to stand, precipitation and separation.

After step (1), 1 to 5 parts by weight of coco-peat is added to 100 parts by weight of the first mixture. The coco-peat is used after being dried at 160 to 170° C. for 1 to 2 hours so as to have a water content of 5 to 7 wt %.

After step (2), 1 to 5 parts by weight of wood fiber is added to 100 parts by weight of the fermentation product. The wood fiber has a length of 8 to 10 mm.

After step (5), 1 to 5 parts by weight of fulvic acid and 1 to 5 parts by weight of citric acid are added to 100 parts by weight of the compost powder.

The method further includes a step of irradiating the synthetic resin with 5 to 10 kGy of gamma-rays, before step (6).

In step (6), 1 to 5 parts by weight of a binding enhancer is added to 100 parts by weight of the second mixture composed of the compost powder, the synthetic resin, the binder, the dispersing agent and the slip agent. The binding enhancer includes 50 to 60 wt % of phenolic modified rosin ester resin, 20 to 30 wt % of thermoplastic polyurethane resin, 10 to 20 wt % of an ethylene vinyl acetate copolymer, and 1 to 5 wt % of terephthalic acid-modified polyamide resin.

DETAILED DESCRIPTION OF THE ILLUSTRATED EMBODIMENTS

Hereinafter, the present disclosure will be described in detail.

First, a method of producing bioplastic pellets using livestock manure according to the present disclosure will be described.

The method of producing bioplastic pellets using livestock manure according to the present disclosure includes steps of:

(1) making a first mixture by mixing 60 to 80 wt % of livestock manure, 10 to 20 wt % of sawdust, 5 to 15 wt % of a microbial medium, and 1 to 7 wt % of a microbial preparation;

(2) making a fermentation product by stirring the first mixture;

(3) making an aged product by aging the fermentation product;

(4) making a dried product by drying the aged product;

(5) making compost powder by crushing the dried product; and (6) mixing the compost powder with synthetic resin, a binder, a dispersing agent and a slip agent to obtain a composition, and cutting the composition into pellets during extrusion.

In step (1), the livestock manure may be any one or more of cow manure, pig manure and chicken manure.

The sawdust serves to absorb water from the livestock manure.

The microbial medium may be a mushroom medium. The microbial medium may serve to easily ferment and decompose the livestock manure mixed with the sawdust.

The microbial preparation serves to promote fermentation of the livestock manure mixed with the sawdust so that the livestock manure is more easily decomposed.

The microorganism preparation according to the present disclosure has an advantage in that it can shorten the fermentation time by further promoting fermentation of the livestock manure.

In step (1), the first mixture has a water content of 45 to 50 wt %.

The microbial agent includes 100 parts by weight of an enzyme activity aid, 1 to 10 parts by weight of a mixture of microbial strains, 20 to 30 parts by weight of a physiologically activating substance, and 1 to 5 parts by weight of humic acid.

The enzyme activity aid is prepared by adding 0.1 to 1 part by weight of *Bacillus natto* to 100 parts by weight of meat washing water, followed by anaerobic fermentation for 5 to 7 days and aerobic fermentation for 40 to 42 days.

The term "meat washing water" refers to washing water used to process any one or more of pork, chicken, beef, duck, lamb, goat, turkey meat, horse meat, or dog meat.

The *Bacillus natto* is present in straw, and about 10 million *Bacillus natto* adhere to a bundle of straw. The *Bacillus natto* is 2.33 microns in length and 1 micron in width, and has the property of forming spores for the preservation of species.

The mixture of microbial strains includes 40 to 50 wt % of *Monascus pilosus,* 20 to 30 wt % of *Bacillus subtilis,* 10 to 20 wt % of yeast, and 5 to 15 wt % of *Aspergillus oryzae.*

The mixture of microbial strains is a concept of mixing *Monascus pilosus, Bacillus subtilis,* yeast and *Aspergillus oryzae* together. When the strains are mixed in this way, the production of complex active enzymes is possible.

*Monascus pilosus* is a red filamentous fungus belonging to the genus *Ascomycetes* (Ascomycota), and produces various beneficial metabolites such as dark red pigments and monacolin K in the process of fermenting grains such as rice. This fungus has been used for a long time as a material for a natural food coloring agent or a processed product and for promoting digestion and improving blood flow in various regions of East Asia, mainly in China. Mebinoline, a secondary metabolite produced by *Monascus pilosus,* strongly inhibits HMG-CoA (3-hydroxymethyl-3-glutaryl-coenzyme) reductase, a cholesterol biosynthetic enzyme, thereby reducing blood lipid levels and inhibiting cholesterol synthesis. In addition, *Monascus pilosus* inhibits cholesterol synthesis or has various functionalities such as antifungal activity, inhibition of blood glucose elevation, regulation of blood glucose levels, anti-obesity, and anti-cancer functions. In addition, *Monascus pilosus* produces red pigments (rubropuntain, monascorubin), yellow pigments (monascin, ankaflavin), purple pigments (rubropunctamine, monascorubramine), and the like, and these pigments have antibacterial and anticancer effects.

*Monascus pilosus* that is used in the present disclosure may be any one selected from the group consisting of *Monascus pilosus, Monascus ruber, Monascus purpureus, Monascus kaoliang, Monascus barykery,* and *Monascus anka.*

*Subtilis bacillus* that is used in the present disclosure may be any one selected from the group consisting of *B. subtilis, B. lichneformis, B. megaterium., B. amyloliquefaciens, B. natro, B. antharcis, B. lentus, B. pumilus, B. thuringiensis, B. alvei, B. azotofixans, B. macerans, B. polymyxa, B. popilliae, B. coagulans, B. stearothermophilus, B. pasteurii, B. sphaericus,* and *B. fastidiosus.*

The yeast that is used in the present disclosure may be any one selected from the group consisting of *Saccharomyces rouxii, Saccharomyces cereviciae, Saccharomyces oviformis,* and *Saccharomyces steineri.*

*Aspergillus oryzae* that is used in the present disclosure may be any one selected from the group consisting of *Aspergillus oryzae* and *Aspergillus sojae*.

The physiologically activating substance includes a supernatant obtained by adding 1 to 5 parts by weight of the enzyme activity aid and 10 to 20 parts by weight of water to 100 parts by weight of an organic matter, followed by anaerobic fermentation for 10 to 20 days and aerobic fermentation for 1 to 3 days to obtain a fermented substance, adding 100 parts by weight of the fermented substance to 500 to 600 parts by weight of water to obtain a fermented substance aqueous solution, and fermenting the fermented substance aqueous solution in an aeration tank for 2 to 5 days, followed by allowing to stand, precipitation and separation.

The organic material that is used may be any one or more selected from among rice bran, rice bran and fishmeal. The fishmeal refers to powder obtained by drying and grinding fish.

The humic acid is an organic material extracted from the soil by alkali or deposited by acid, and is a medium to high-molecular-weight acidic material of yellowish brown to blackish brown color, and the composition thereof is composed of 50 to 60% carbon, 3 to 5% hydrogen, 1.5 to 6% nitrogen, about 1. sulfur, about 1% ash, and 30 to 50 oxygen. The humic acid has a benzene nucleus and aromatic rings such as naphthalene, pyridine, and anthracene, and has many conjugated double bonds. The humic acid as a cofactor of the enzyme activity aid is used in the microbial metabolic system while being decomposed into amino acids, glucose, fatty acids, glycerin, etc. upon a primary enzymatic reaction. At this time, the humic acid becomes a substrate where microorganisms can inhabit, and thus the humic acid also acts as a biological catalyst. In addition, the humic acid prevents a decrease in the activity of microorganisms by absorbing phosphorus, iron, etc. that inhibit the activity of microorganisms. In addition, the humic acid may serve a source for phosphoric acid and carbon so that microorganisms can form a community and propagate.

After step (1), 1 to 5 parts by weight of coco-peat may be added to 100 parts by weight of the first mixture.

The present disclosure has an advantage in that the water content of the first mixture may be reduced by adding coco-peat to the first mixture.

If less than 1 part by weight of coco-peat is added to 100 parts by weight of the first mixture, there is a problem in that the effect of reducing the water content of the first mixture is insufficient, and if more than 5 parts by weight of coco-peat is added to 100 parts by weight of the first mixture, there is a problem in that. the fermentation rate is slow.

After 1 to 5 parts by weight of coco-peat is added to 100 parts by weight of the first mixture, the water content of the first mixture is 35 to 40 wt %.

The coco-peat is generally called copea, coir, or coirdust, and is a by-product of the coconut industry, which is well developed throughout the Pacific, Indian Ocean and Philippine Islands. Coconut is composed of coconut milk, copra, which is a raw material for palm oil, a shell having a very stable carbon structure when carbonized, and a fiber layer from which palm fibers are extracted. Coco peat is dark brown powder as a by-product obtained after the production of this primary product of coconut, has excellent water-absorbing and dehumidifying ability, and has a low salt content. As the components of coco-peat, cellulose and lignin account for more than 90% of coco-peat, and the particles of coco-peat have a porous network structure, which is advantageous for ensuring air permeability. Common coco peat contains a water content of 10 to 20% and has excellent water retention ability.

The coco-peat is preferably dried at 160 to 170° C. for 1 to 2 hours so as to have a water content of 5 to 7 wt %.

If the water content of the coco-peat is less than 5 wt %, there is a problem in that the fermentation rate is slow, and the water content of the coco-peat is more than 7 wt %, there is a problem in that the effect of reducing the water content of the first mixture is reduced.

Step (2) is a step of making a fermentation product by stirring the first mixture at 20 to 30° C. for 3 to 4 hours.

The present disclosure has an advantage in that the fermentation time may be shortened by using the microbial preparation because fermentation is sufficient even when stirring is performed only for 3 to 4 hours.

In step (2), the water content of the fermentation product is 25 to 30 wt %.

After step (2), 1 to 5 parts by weight of wood fiber may be added to 100 parts by weight of the fermentation product.

The present disclosure has an advantage in that the water content of the fermentation product may be reduced by adding wood fiber to the fermentation product.

If less than 1 part by weight of wood fiber is added to 100 parts by weight of the fermentation product, there is a problem in that the effect of reducing the water content is insufficient, and when more than 5 parts by weight of wood fiber is added, there is a problem that the aging rate is slow.

After 1 to 5 parts by weight of wood fiber may be added to 100 parts by weight of the fermentation product, the water content of the fermentation product is 20 to 25 wt %.

The length of the wood fiber is preferably 8 to 10 mm. If the length of the wood fiber is less than 8 mm, there is a problem that the effect of reducing the load factor during extrusion is lowered, and if length of the wood fiber is more than 10 mm, there is a problem in that the homogeneity of mixing with the fermentation product decreases.

Step (3) is a step of making an aged product by aging the fermentation product at 20 to 25° C. for 10 to 15 days.

The present disclosure has an advantage in that it is possible to shorten the aging period by using the microbial preparation.

The water content of the aged product is 15 to 20 wt %.

Step 4 is a step of making a dried product by drying the aged product at 30 to 35° C. for 22 to 24 hours.

The water content of the dried product is 1 to 3 wt %.

Step (5) is a step of making compost powder by crushing the dried product to a size of 100 to 150 mesh After step (5), 1 to 5 parts by weight of fulvic acid and 1 to 5 parts by weight of citric acid may be added to 100 parts by weight of the compost powder The present disclosure has an advantage in that it is possible to increase the binding force between the compost powder and synthetic resin by adding fulvic acid and citric acid to the compost powder.

The fulvic acid is obtained from a natural humic substance by a purified water extraction method using purified water. The fulvic acid is obtained through extraction by adding purified water to a natural humic substance so that the concentration of the natural humic substance becomes 5 to 10%, and then stirring the aqueous solution at 60 to 70° C., and filtering and concentrating the obtained supernatant.

The natural humic substance is a natural substance that has excellent antibacterial and antifungal effects while having a significant effect on improvement of the water quality environment and the fish farm environment. This natural humic substance corresponds to humic soil, which is sedimentary soil where plant residues have been deposited and have undergone decomposition for tens of millions of years. Fulvic acid composed of low molecular weight acids, extracted from this natural humic substance, has high biological activity and has the ability to easily bind to minerals and elements in the molecular structure. In addition, it contains hundreds of complex minerals, a large number of nutrients, and a large amount of dissolved oxygen, and has an effect of increasing the reactivity due to low surface tension.

The citric acid is a polybasic carbozylic acid having a hydroxyl group (—OH), and when it is crystallized in water, a large columnar crystal with crystal water of molecule is formed. When citric acid is heated, it becomes an anhydride which has a melting point of 153° C. and becomes aconitic acid at 175° C. At high temperature, it produces itaconic anhydride or the rearranged product citraconic anhydride and acetonedicarboxylic acid. The citric acid is well soluble in water and ethanol, and when a microorganism is cultured using sugar as a substrate, a phenomenon occurs in which citric acid is accumulated in the culture medium. This phenomenon is known as citric acid fermentation. As a microorganism causing citric acid fermentation, *Aspergillus niger* is usually used. When fermentation using *Aspergillus niger* is performed under an acidic condition (pH 2 to 3) at about 30° C. for 7 to 10 days, citric acid may be obtained.

Step (6) is a step of mixing 55 to 60 wt % of the compost powder, 30 to 35 wt % of synthetic resin, 1 to 5 wt % of a binder, 5 to 10 wt % of a dispersing agent and 0.5 to 1 wt % of a slip agent for 15 to 30 minutes to obtain a composition, and cutting the composition into pellets during extrusion at 160 to 190° C.

The present disclosure has an advantage in that it is possible to improve the mechanical strength of the pellets despite the use of 55 to 60 wt % of the compost powder.

The synthetic resin may be any one selected from the group consisting of polypropylene, polyethylene, polyvinyl chloride, polystyrene, polymethyl methacrylate, polyethylene terephthalate, nylon, and combinations thereof.

The binder preferably includes 50 to 65 wt % of a styrene-maleic anhydride copolymer, 20 to 35 wt % of polysiloxane, and 10 to 25 wt % of 2-hydroxyethyl methacrylate.

The present disclosure has an advantage in that it is possible to increase the binding force between the compost powder and the synthetic resin by using a binder consisting of a mixture of a styrene-maleic anhydride copolymer, polysiloxane, and 2-hydroxyethyl methacrylate.

The dispersing agent that is used in the present disclosure may be dolomite powder, but is not limited thereto.

The slip agent that is used in the present disclosure may be an amide-based slip agent, but is not limited thereto.

The method may further include a step of irradiating the synthetic resin with 5 to 10 kGy of gamma rays, before step (6).

The present disclosure has an advantage in that it is possible to increase the binding force between the synthetic resin and the compost powder by irradiating the synthetic resin with gamma-rays to cut a part of the molecular chain and form radicals.

In step (6), 1 to 5 parts by weight of a binding enhancer may be added to 100 parts by weight of the second mixture composed of the compost powder, the synthetic resin, the binder, the dispersing agent and the slip agent.

The binding enhancer serves to further increase the binding force between the compost powder and the synthetic resin.

The binding enhance includes 50 to 60 wt % of phenolic modified rosin ester resin, 20 to 30 wt % of thermoplastic polyurethane resin, 10 to 20 wt % of an ethylene vinyl acetate copolymer, and 1 to 5 wt % of terephthalic acid-modified polyamide resin.

The phenolic modified rosin ester resin serves to improve adhesion.

The thermoplastic polyurethane resin has advantages of excellent heat resistance and cold resistance, a low glass transition temperature, and high mechanical strength.

The ethylene vinyl acetate copolymer has excellent physical properties at low temperature, excellent flexibility, excellent compatibility with other resins, and excellent adhesive performance. The ethylene vinyl acetate copolymer preferably has a vinyl acetate content of 40 to 45 wt, and a softening point of 80 to 85° C.

The terephthalic acid-modified polyamide resin serves not only to increase the binding force between components, but also to increase heat resistance, oil, resistance and mechanical strength. The terephthalic acid-modified polyamide resin is formed of dicarboxylic acid and diamine, and is preferably a thermoplastic polyamide resin produced using terephthalic acid as the dicarboxylic acid.

The method of producing bioplastic pellets using livestock manure according to the present disclosure has an advantage in that it is possible to improve processability by reducing the water content of decomposed livestock manure containing a lot of water.

The method of producing bioplastic pellets using livestock manure according to the present disclosure has an advantage in that it is possible to improve mechanical properties.

Hereinafter, the features and effects of the present disclosure will be described in more detail with reference to examples. However, these examples serve merely to illustrate the present disclosure, and the scope of the present disclosure is not limited to these examples.

Example 1

70 wt % of livestock manure, 15 wt % of sawdust, 10 wt % of a microbial medium and 5 wt % of a microbial preparation were mixed together to make a mixture. The mixture had a water content of 45 wt %. The livestock manure used was cow manure. The microbial medium used was a mushroom medium. The microbial preparation was prepared by mixing 100 parts by weight of an enzyme activity aid, 10 parts by weight of a mixture of microbial strains, 10 parts by weight of a physiologically activating substance, and 5 parts by weight of humic acid together. The enzyme activity aid was prepared by adding 1 part by weight of *Bacillus natto* to 100 parts by weight of meat washing water, followed by anaerobic fermentation for 5 to 7 days and aerobic fermentation for 40 to 42 days. The mixture of microbial strains was prepared by mixing 50 wt % of *Monascus pilosus,* 25 wt % of *Bacillus subtilis,* 15 wt % of yeast, and 10 wt % of *Aspergillus oryzae* together. The physiologically activating substance used was a supernatant obtained by adding 5 parts by weight of the enzyme activity aid and 20 parts by weight of water to 100 parts by weight of an organic matter, followed by anaerobic fermentation for 20 days and aerobic fermentation for 3 days to obtain a fermented substance, adding 100 parts by weight of the fermented substance to 500 parts by weight of water to obtain a fermented substance aqueous solution, and fermenting the fermented substance aqueous solution in an aeration tank for 5 days, followed by allowing to stand, precipitation and separation. The organic matter used was fish meal. The mixture was stirred at 30° C. for 4 hours to make a fermentation product. The fermentation product had a water content of 25 wt %. The fermentation product was aged at 25° C. for 15 days to make an aged product. The aged product. had a water content of 15 wt %. The aged product was dried at 35° C. for 24 hours to make a dried product. The dried product had a water content of 2 wt %. The dried product was crushed to a size of 100 mesh to make compost powder. 55 wt % of the compost powder, 30 wt % of synthetic resin, 5 wt % of a binder, 9 wt % of a dispersing agent and 1. wt % of a slip agent were mixed together for 30 minutes, and then cut while being extruded at 160 to 190° C., thus producing bioplastic pellets using livestock manure. The synthetic resin used was Lotte Chemical PP (polypropylene, B-310, density=0.9 g/cm$^3$, melt index=0.5 g/10 min). The binder used was a mixture of 60 wt % of a styrene-maleic anhydride copolymer, 25 wt % of polysiloxane and 15 wt % of 2-hydroxyethyl methacrylate. The dispersing agent used was dolomite powder. As the slip agent, an amide-based slip agent was used.

Example 2

Bioplastic pellets were produced using livestock manure in the same manner as in Example 1, except that: 5 parts by weight of coco-peat was added to 100 parts by weight of the mixture; 5 parts by weight of wood fiber was added to 100 parts by weight of the fermentation product; 5 parts by weight of fulvic acid and 5 parts by weight of citric acid were added to 100 parts by weight of the compost powder; the synthetic resin was irradiated with 10 kGy of gamma-rays; and 5 parts by weight of a binding enhancer was added to 100 parts by weight of the mixture composed of the compost powder, the gamma-ray-irradiated synthetic resin, the binder, the dispersing agent and the slip agent. The coco-peat was dried at 170° C. for 2 hours so as to have a water content of 5 wt %. The wood fiber used had a length of 10 mm. The binding enhancer used was prepared by mixing 50 wt % of phenolic modified rosin ester resin, 30 wt % of thermoplastic polyurethane resin, 15 wt % of an ethylene vinyl acetate copolymer, and 5 wt % of terephthalic acid-modified polyamide resin.

Comparative Example 1

70 wt % of livestock manure, 15 wt % of sawdust, 14.3 wt % of a microbial medium, and 0.7 wt % of a microorganism for compost decomposition were mixed together to make a compost mixture. The livestock manure used was a mixture of 70 wt % of cow manure, 10 wt % of pig manure and 20 wt % of chicken manure. The microbial medium used was a mushroom medium. As the microorganism for compost decomposition, a 1:1 mixture of Bacillus and lactic acid bacteria was used. The compost mixture had a water content of 50 wt %. The compost mixture was fermented for 2 months while air was injected thereinto, thus preparing a fermented compost. The fermented compost had a water content of 40 wt %. The fermented compost was aged for 2 months to make an aged compost. The aged compost had a water content of 35 wt %. The aged compost was dried to make a dried compost. The dried compost had a water content of 5 wt %. The dried compost was crushed to 80 mesh to make compost particles. 40 wt % of the compost particles, 40 wt % of synthetic resin, 5 wt % of an antibacterial agent, 2 wt % of a binder, 10 wt % of a dispersing agent, 1 wt % of a slip agent, 1 wt % of acrylic powder, and 1 wt % of oil were thermally mixed together at a temperature of 80° C. for 30 minutes, and the resulting mixture was cut while being extruded at a temperature of 160 to 190° C., thus producing bioplastic pellets using livestock manure. The synthetic resin used was Lotte Chemical PP (polypropylene, B-310, density=0.9 g/cm$^3$, melt index=0.5 g/10 min). The antibacterial agent used was pozzolan. As the binder, maleic anhydride was used. The dispersing agent used was dolomite powder. As the slip agent, an amide-based slip agent was used. As the oil, liquid paraffin was used.

Comparative Example 2

90 wt % of synthetic resin, 9 wt % of a dispersing agent, and 1 wt % of a slip agent were mixed together for 30 minutes, and then cut while being extruded at 160 to 190° C., thus producing pellets. The synthetic resin used was Lotte Chemical PP (polypropylene, B-310, density=0.9 g/cm$^3$, melt index=0.5 g/10 min). The dispersing agent used was dolomite powder. As the slip agent, an amide-based slip agent was used.

Test Example 1

Each of the pellets produced using livestock manure in Examples 1 and 2 and Comparative Example 1 and the pellets produced in Comparative Example 2 were injection-molded into test specimens according to ASTM standards (methods for measurement of tensile properties and impact strength), and then the physical properties of the test specimens were measured according to the following measurement methods.

For the measurement of tensile strength, according to ASTM D 638 (Standard Test Method for Tensile Properties of Plastics), a dumbbell-shaped test specimen was prepared, and the tensile strength thereof was measured by applying a load (N) in a tensile direction using a universal strength tester until the specimen was broken. Then, the tensile strength (MPa) of the test specimen was calculated by dividing the maximum load (N) value by the cross-sectional area (m$^2$) of the initial specimen.

For measurement of impact strength, according to ASTM D 256 (Standard Test Method for Tensile Properties of Plastics), a notched test specimen was prepared, and the impact strength value thereof was measured using an Izod impactor.

The flexural strength and flexural modulus of each test specimen were measured according to ASTM D 790 (Standard Test Method for Tensile Properties of Plastics.

The physical property values measured by the above measurement methods are shown in Table 1. below.

TABLE 1

| | Extrusion workability | Tensile strength (MPa) | Flexural strength (MPa) | Flexural modulus (MPa) | Impact strength (J/m) |
|---|---|---|---|---|---|
| Example 1 | Good | 26 | 34 | 2,994 | 65 |
| Example 2 | Good | 29 | 37 | 3,002 | 68 |
| Comparative Example 1 | Poor | 12 | 22 | 2,214 | 32 |
| Comparative Example 2 | Good | 27 | 35 | 2,997 | 66 |

As shown in Table 1 above, it can be confirmed that the bioplastic pellets produced using livestock manure in Examples 1 and 2 have better tensile strength, flexural strength, flexural modulus and extrusion workability than the bioplastic pellets produced using livestock manure in Comparative Example 1.

In addition, it can be seen that the tensile strength, flexural strength and flexural modulus of the bioplastic pellets produced using livestock manure in Examples 1 and 2 are similar to those of the general pellets produced in Comparative Example 2.

As described above, the method of producing bioplastic pellets using livestock manure according to the present disclosure has an advantage in that it is possible to improve processability by reducing the water content of decomposed livestock manure containing a lot of water.

In addition, the method of producing bioplastic pellets using livestock manure according to the present disclosure has an advantage in that it is possible to improve the mechanical properties of the pellets.

What is claimed is:

1. A method of producing bioplastic pellets using livestock manure, the method comprising steps of:
   (1) making a first mixture by mixing 60 to 80 wt % of livestock manure, 10 to 20 wt % of sawdust, 5 to 15 wt % of a microbial medium, and 1 to 7 wt % of a microbial preparation;
   (2) making a fermentation product by stirring the first mixture at 20 to 30° C. for 3 to 4 hours;
   (3) making an aged product by aging the fermentation product at 20 to 25° C. for 10 to 15 days;
   (4) making a dried product by drying the aged product at 30 to 35° C. for 22 to 24 hours;
   (5) making compost powder by crushing the dried product to a size of 100 to 150 mesh; and
   (6) mixing 55 to 60 wt % of the compost powder, 30 to 35 wt % of synthetic resin, 1 to 5 wt % of a binder, 5 to 10 wt % of a dispersing agent and 0.5 to 1 wt % of a slip agent for 15 to 30 minutes to obtain a second mixture, and cutting the second mixture into pellets during extrusion at 160 to 190° C.,
   wherein the binder in step (6) comprises 50 to 65 wt % of a styrene-maleic anhydride copolymer, 20 to 35 wt % of polysiloxane, and 10 to 25 wt % of 2-hydroxyethyl methacrylate.

2. The method of claim 1, wherein the microbial preparation in step (1) comprises 100 parts by weight of an enzyme activity aid, 1 to 10 parts by weight of a mixture of microbial strains, 20 to 30 parts by weight of a physiologically activating substance, and 1 to 5 parts by weight of humic acid, wherein the enzyme activity aid is prepared by adding 0.1 to 1 part by weight of *Bacillus natto* to 100 parts by weight of meat washing water, followed by anaerobic fermentation for 5 to 7 days and aerobic fermentation for 40 to 42 days, the mixture of microbial strains comprises 40 to 50 wt % of *Monascus pilosus*, 20 to 30 wt % of *Bacillus subtilis*, 10 to 20 wt % of yeast, and 5 to 15 wt % of *Aspergillus oryzae*, and the physiologically activating substance is a supernatant obtained by adding 1 to 5 parts by weight of the enzyme activity aid and 10 to 20 parts by weight of water to 100 parts by weight of an organic matter, followed by anaerobic fermentation for 10 to 20 days and aerobic fermentation for 1 to 3 days to obtain a fermented substance, adding 100 parts by weight of the fermented substance to 500 to 600 parts by weight of water to obtain a fermented substance aqueous solution, and fermenting the fermented substance aqueous solution in an aeration tank for 2 to 5 days, followed by allowing to stand, precipitation and separation.

3. The method of claim 1, wherein 1 to 5 parts by weight of coco-peat is added to 100 parts by weight of the first mixture after step (1), and the coco-peat is used after being dried at 160 to 170° C. for 1 to 2 hours so as to have a water content of 5 to 7 wt %.

4. The method of claim 1, wherein 1 to 5 parts by weight of wood fiber is added to 100 parts by weight of the fermentation product after step (2), and the wood fiber has a length of 8 to 10 mm.

5. The method of claim 1, wherein 1 to 5 parts by weight of fulvic acid and 1 to 5 parts by weight of citric acid are added to 100 parts by weight of the compost powder after step (5).

6. The method of claim 1, further comprising a step of irradiating the synthetic resin with 5 to 10 kGy of gamma-rays, before step (6).

7. The method of claim 1, wherein 1 to 5 parts by weight of a binding enhancer is added to 100 parts by weight of the second mixture composed of the compost powder, the synthetic resin, the binder, the dispersing agent and the slip agent in step (6), wherein the binding enhancer comprises 50 to 60 wt % of phenolic modified rosin ester resin, 20 to 30 wt % of thermoplastic polyurethane resin, 10 to 20 wt % of an ethylene vinyl acetate copolymer, and 1 to 5 wt % of terephthalic acid-modified polyamide resin.

* * * * *